United States Patent
Monji

(10) Patent No.: US 8,063,988 B2
(45) Date of Patent: Nov. 22, 2011

(54) TELEVISION RECEIVER

(75) Inventor: Masato Monji, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 1308 days.

(21) Appl. No.: 11/678,415

(22) Filed: Feb. 23, 2007

(65) Prior Publication Data

US 2008/0068503 A1    Mar. 20, 2008

(30) Foreign Application Priority Data

Feb. 23, 2006   (JP) .................. 2006-046356

(51) Int. Cl.
*H04N 5/445* (2011.01)
*G06F 3/00* (2006.01)

(52) U.S. Cl. .............. 348/564; 725/40; 725/44

(58) Field of Classification Search .......... 348/563, 348/569, 552, 553, 468, 462, 473, 474; 725/140, 725/40, 44–47
See application file for complete search history.

(56) References Cited

U.S. PATENT DOCUMENTS

| | | | | |
|---|---|---|---|---|
| 7,339,992 B2 * | 3/2008 | Chang et al. | ............ | 375/240.25 |
| 2002/0083473 A1 * | 6/2002 | Agnihotri et al. | ............ | 725/140 |

FOREIGN PATENT DOCUMENTS

| | | |
|---|---|---|
| JP | 2001-197430 A | 7/2001 |
| JP | 2003-203035 A | 7/2003 |
| JP | 2004-80587 A | 3/2004 |

* cited by examiner

*Primary Examiner* — Michael Lee

(74) *Attorney, Agent, or Firm* — Crowell & Moring LLP

(57) ABSTRACT

A TV receiver, which comprises an image character recognition means to recognize captions included in images of the TV programs as characters, a TV program type determination means to determine types of the TV programs, and an information screen generating means to generate information screens whose form and contents are adapted to each type of the TV programs. A main controller serves as the image character recognition means, the TV program type determination means, and the information screen generating means described above. When storing the TV programs in a hard disk, the main controller recognizes characters included in images of the TV programs and also determines type of the TV programs. After the determination described above, the main controller generates an information screen whose form and contents are adapted to the type of the TV program, which is determined by the TV program type determination means, with using the characters recognized in the recognition process described above, and then displays the information screen on a display.

15 Claims, 4 Drawing Sheets

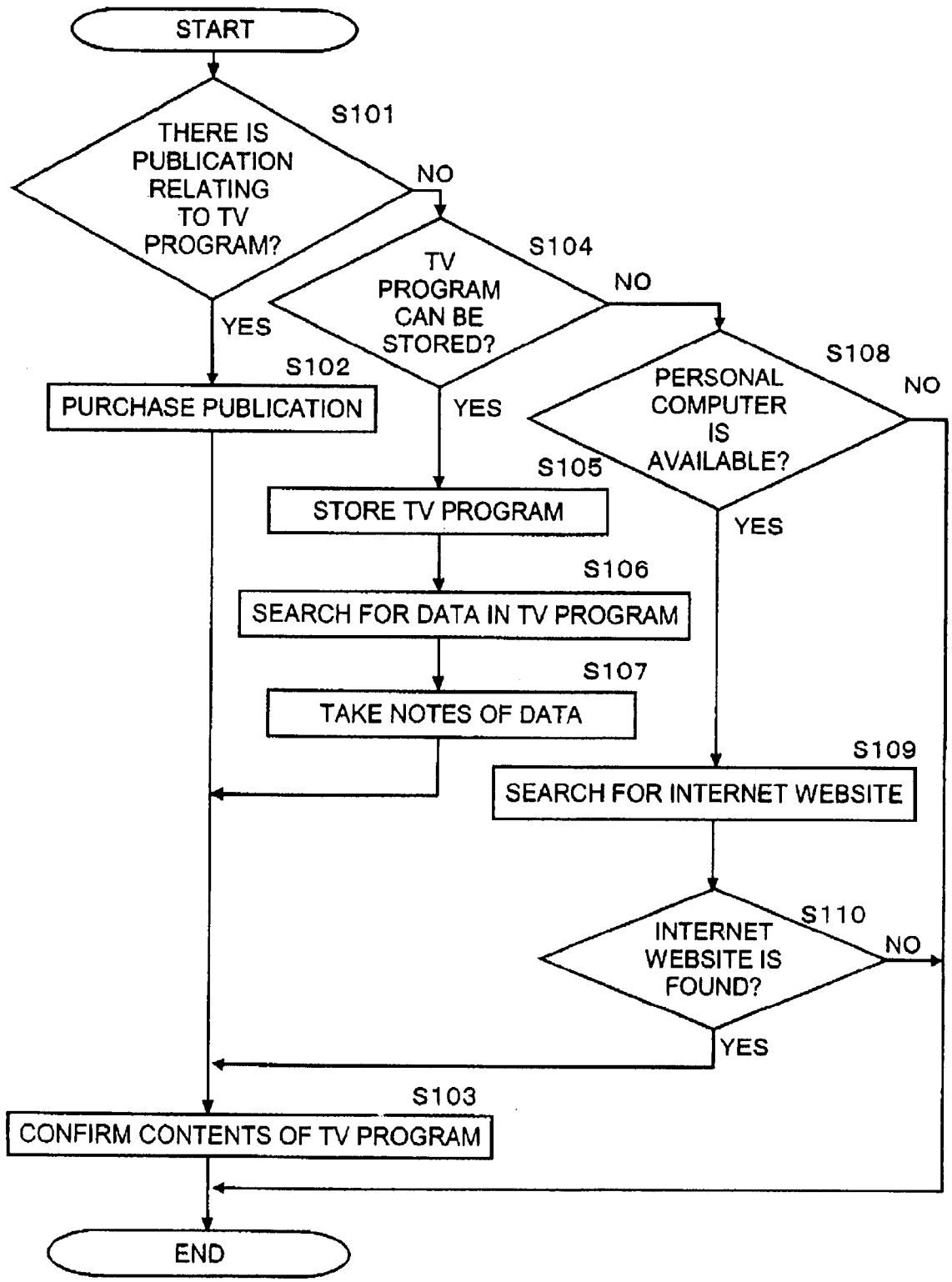

TELEVISION RECEIVER

BACKGROUND OF THE INVENTION

1. Field of the Invention

The present invention relates to a television (hereinafter, referred to as "TV") receiver such as a TV receiver with a built-in hard disk drive, and more particularly, it relates to a display of contents which are included in TV programs.

2. Description of the Related Art

Recently, after watching TV programs on travel, cooking, and so on (abbreviated as "TV programs" hereinafter), users sometimes purchase a publication in which contents of the TV programs are described, review an Internet website for the TV programs, and watch the TV programs again with taking notes to organize and confirm the contents of the TV programs which the users already watched (abbreviated simply as "confirm" or "the confirmation" hereinafter).

FIG. 5 shows an example of a conventional confirmation process carried out by a user to confirm contents of a TV program. Firstly, when there is a publication in which the contents of the TV program watched by the user are described (YES in S101), the user purchases the publication (S102) and confirms the contents of the TV program described in the publication (S103), and then the confirmation is completed. In contrast, when there is no publication in which the contents of the TV program are described (NO in S101), and also when the TV program can be stored in a hard disk recorder or the like (YES in S104), the user stores the TV program in the hard disk recorder or the like (S105). Subsequently, the user searches for desired data in the TV program stored in the hard disk recorder (S106), takes notes of the data searched at the S106 (S107), confirms the contents of the TV program from the notes (S103), and then the confirmation is completed.

When the TV program cannot be stored in the hard disk recorder or the like in the S104 described above (NO in S104), and also when the user can use a personal computer which can be connected to the Internet (YES in S108), the user searches for an Internet website in which the contents of the TV program are described with operating the personal computer (S109). When the user can find out the Internet website after the search (YES in S110), the user confirms the contents of the TV program described in the Internet website (S103), and then the confirmation is completed. In contrast, when the user cannot find out the Internet website at the S109 (NO in S110), the user completes the confirmation without carrying out the S103 described above.

As described above, when confirming the contents of the TV program which is already watched, the user needs to purchase the publication in which the contents of the TV program are described, review the Internet website of the TV program, or watch the TV program again with taking notes, and those confirmations make the user go to trouble.

SUMMARY OF THE INVENTION

The present invention is to solve the problem described above, and an object of the present invention is to provide a TV receiver which enables users to confirm easily the contents of the TV program, which is already watched, by generating an information screen having the contents of the TV program while storing the TV program in a hard disk.

According to an aspect of the present invention, the object described above is achieved by a TV receiver comprising a display means to display images based on image signals, which are included in TV broadcast signals on TV programs, and various messages, a control means to control each component of the TV receiver, an image character recognition means to recognize captions included in images of the TV programs as characters, a TV program type determination means to determine types of the TV programs, and an information screen generating means to generate an information screen whose form and contents are adapted to each type of the TV programs".

In the TV receiver, a recording means can be used to store the TV programs.

When the TV programs are stored in the recording means, the control means recognizes characters included in images of the TV programs with using the image character recognition means, and also determines type of the TV programs with using the TV program type determination means, and subsequently, the control means further generates an information screen whose form and contents are adapted to each type of the TV programs, which are determined by the TV program type determination means, with using characters recognized by the image character recognition means, and then displays the information screen on the display means.

In the above composition, the control means generates the information screen whose form and contents are adapted to the type of the TV programs, which are determined by the TV program type determination means, with using the characters recognized by the image character recognition means, and then displays the information screen on the display means. Consequently, a trouble of user's confirming the contents of the TV program, which is already watched, can be reduced.

Preferably, the TV receiver further comprises a voice character recognition means to recognize words included in audios of the TV programs as characters, and when the TV programs are stored in the recording means, the control means recognizes characters included in images and audios of the TV programs with using the image character recognition means and the voice character recognition means, and also determines types of the TV programs with using the TV program type determination means, and subsequently, the control means further generates an information screen whose form and contents are adapted to each type of the TV programs, which is determined by the TV program type determination means, with using characters recognized by the image character recognition means and the voice character recognition means, and then displays the information screen on the display means.

More preferably, the TV receiver further comprises a tuner to receive TV broadcast signals of the TV programs.

More preferably, the TV receiver further comprises the recording means.

A hard disk drive is also applicable to the recording means.

While the novel features of the present invention are set forth in the appended claims, the present invention will be better understood from the following detailed description taken in conjunction with the drawings.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein:

FIG. 5 is a flowchart showing a conventional confirmation process on contents in a TV program.

DESCRIPTION OF THE PREFERRED EMBODIMENTS

Referring now to the accompanying drawings, the preferred embodiment of the present invention is described. The present invention relates to a television (hereinafter, referred to as "TV") receiver. In the embodiment described below, the present invention is applied to a digital television receiver with a built-in hard disk drive. It is to be noted that the following description of preferred embodiment of the present invention has been presented for purposes of illustration and description, and is not intended to be exhaustive or to limit the present invention to the precise form disclosed.

Figure 1:
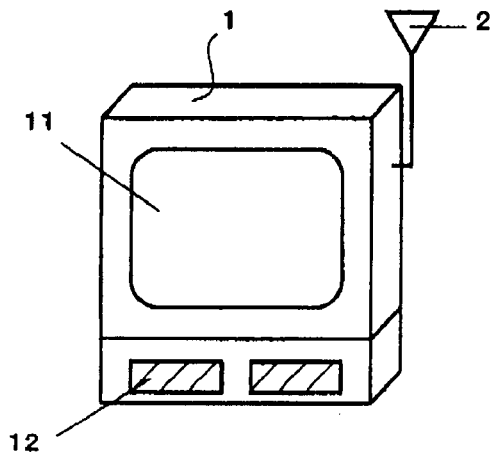
FIG. 1 is a perspective view illustrating an appearance of a digital TV according to a preferred embodiment of the present invention.
Figure 2:
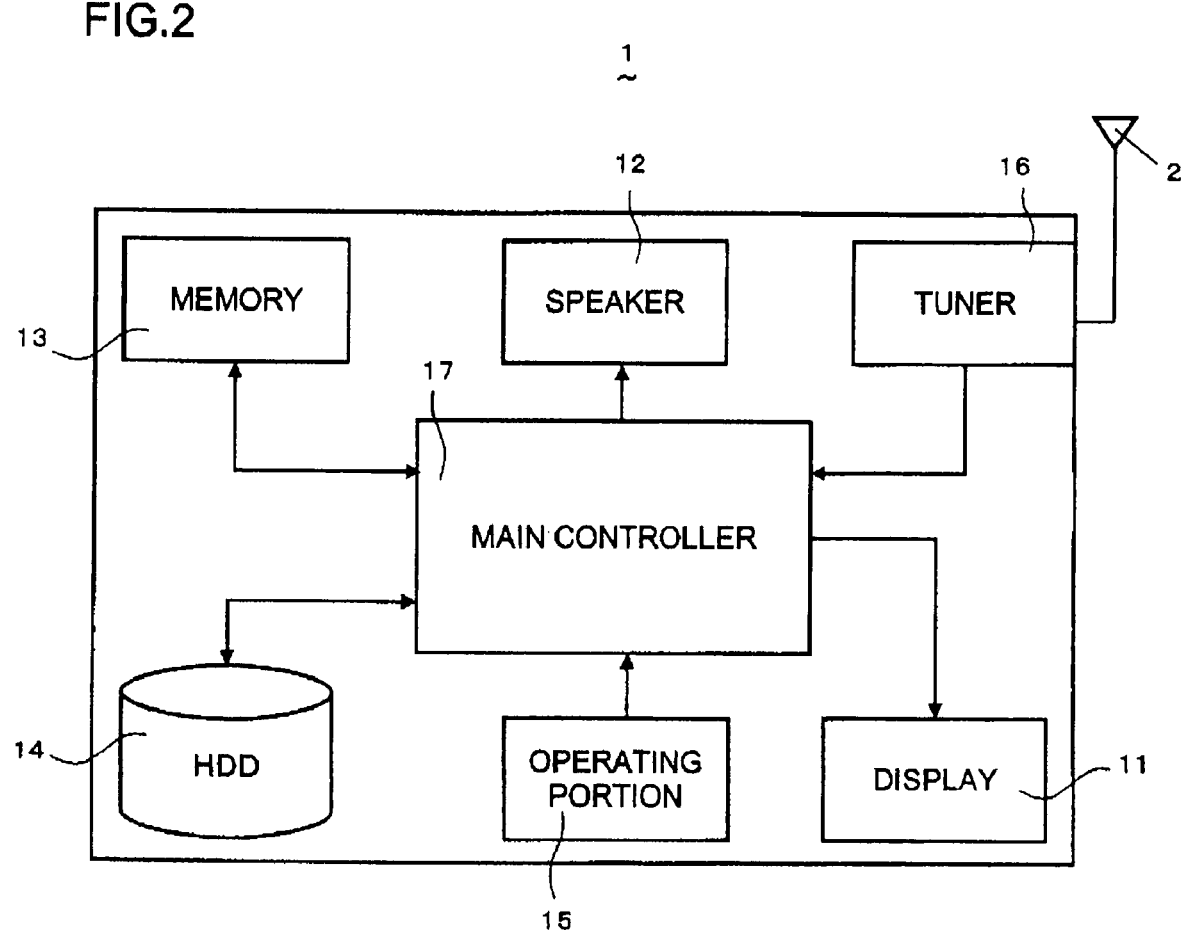
FIG. 2 is a diagram illustrating an internal structure of the digital TV.

FIG. 1 shows an appearance of a digital TV receiver (abbreviated as "a digital TV" hereinafter: indicating "a TV receiver" in the appended claims) 1 according to the present embodiment, and FIG. 2 shows an internal structure of the digital TV 1.

The digital TV 1 comprises a tuner 16 which receives TV broadcast signals of TV programs on travel, cooking, news, talk show, and so on (abbreviated simply as "TV programs" hereinafter) through an antenna 2, a display 11 (claimed display means) which displays images based on image signals, which are included in the TV broadcast signals received by the tuner 16, various messages, and so on, a speaker 12 which outputs audios based on audio signals, which are included in the TV broadcast signals received by the tuner 16, an operating portion 15 which includes buttons and so on operated by a user, a hard disk drive (abbreviated as "HDD" hereinafter) 14 which includes a bard disk (not shown) to store the TV programs, a main controller 17 (control means) which controls each component of the digital TV 1, and a memory 13 which stores operation programs for the main controller 17. In the HDD 14, map data are stored in advance.

The main controller 17 serves as an image character recognition means to recognize captions included in images of the TV programs as characters, a voice character recognition means to recognize words included in audios of the TV programs as characters, a TV program type determination means to determine types of the TV programs, and an information screen generating means to generate information screens whose generates and contents are adapted to each type of the TV programs, respectively. In case that there is information, which indicate a place such as an address or the like, in the characters taken from the TV program, the main controller 17 can obtain an image of a map corresponding to the address or the like described above from map data stored in the HDD 14, and then display the image of the map on the information screen. Forms of the information screen vary by type of the TV programs such as travel, cooking, news, talk show, and so on, thus in the form of the information screen relating to the TV program on travel, for example, information of walking direction, map, comments of performers, and so on are displayed. In contrast, in the form of the information screen relating to the TV program on cooking, information of recipe ingredient list, feedback on the cooking, and so on are displayed.

Figure 3:
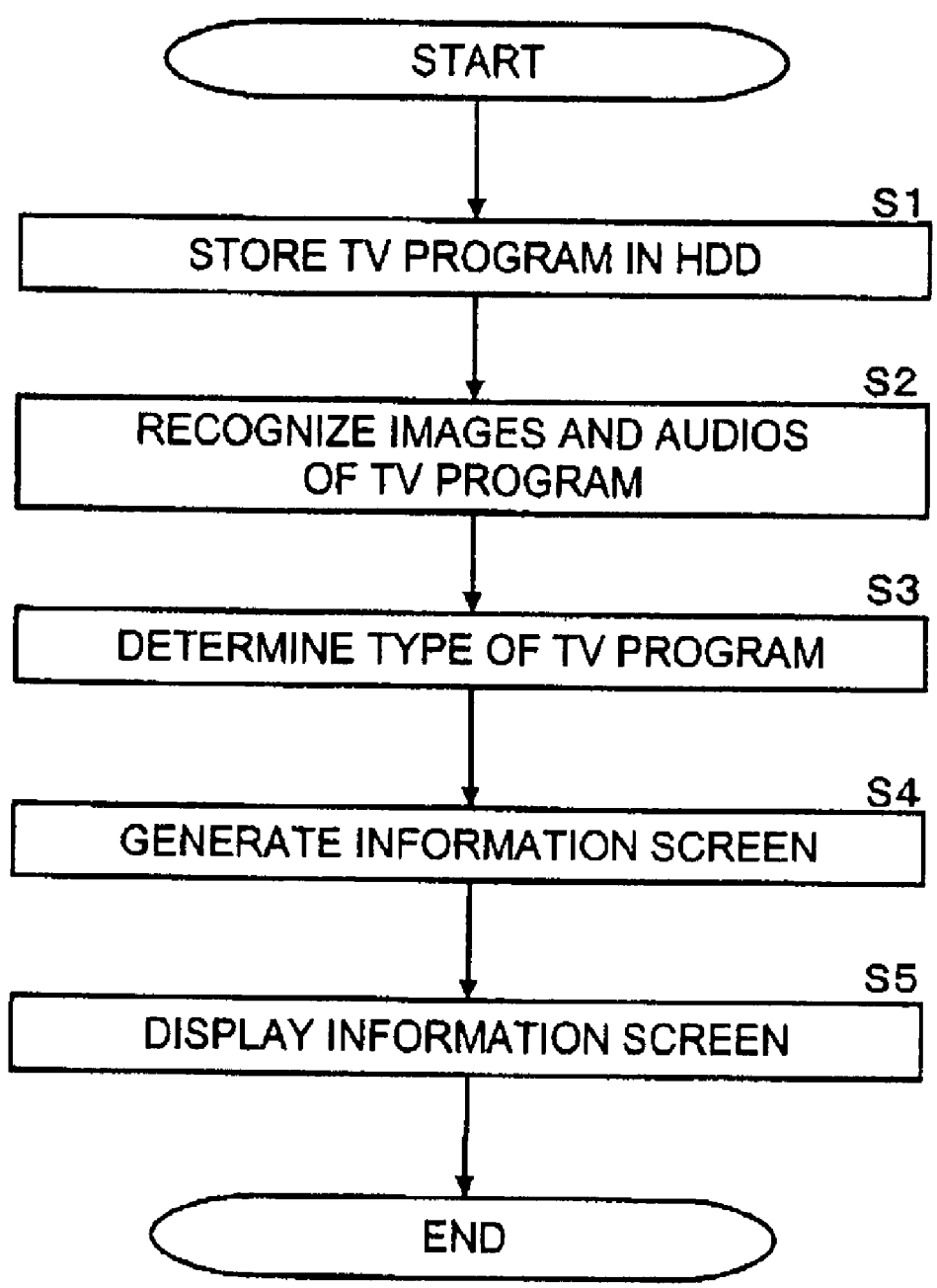
FIG. 3 is a diagram illustrating a process of a main controller in the digital TV.

Next, a process of the main controller 17 in storing the TV programs in the digital TV 1 is described with reference to FIG. 3. Firstly, when the TV programs are stored in the hard disk in the HDD 14 through an operation of the operating portion 15 by the user (S1), the main controller 17 recognizes the characters included in the images and audios of the TV programs (S2), and further determines the types of the TV programs based on the recognized characters (title of the TV programs, mainly) (S3).

After the determination described above, the main controller 17 subsequently generates the information screen whose form and content are adapted to the type of the TV program, which is determined in the S3 described above, with using the characters recognized in the S2 (S4), and then displays the information screen generated in the S4 on the display 11 (S5), and the process is completed.

Figure 4:
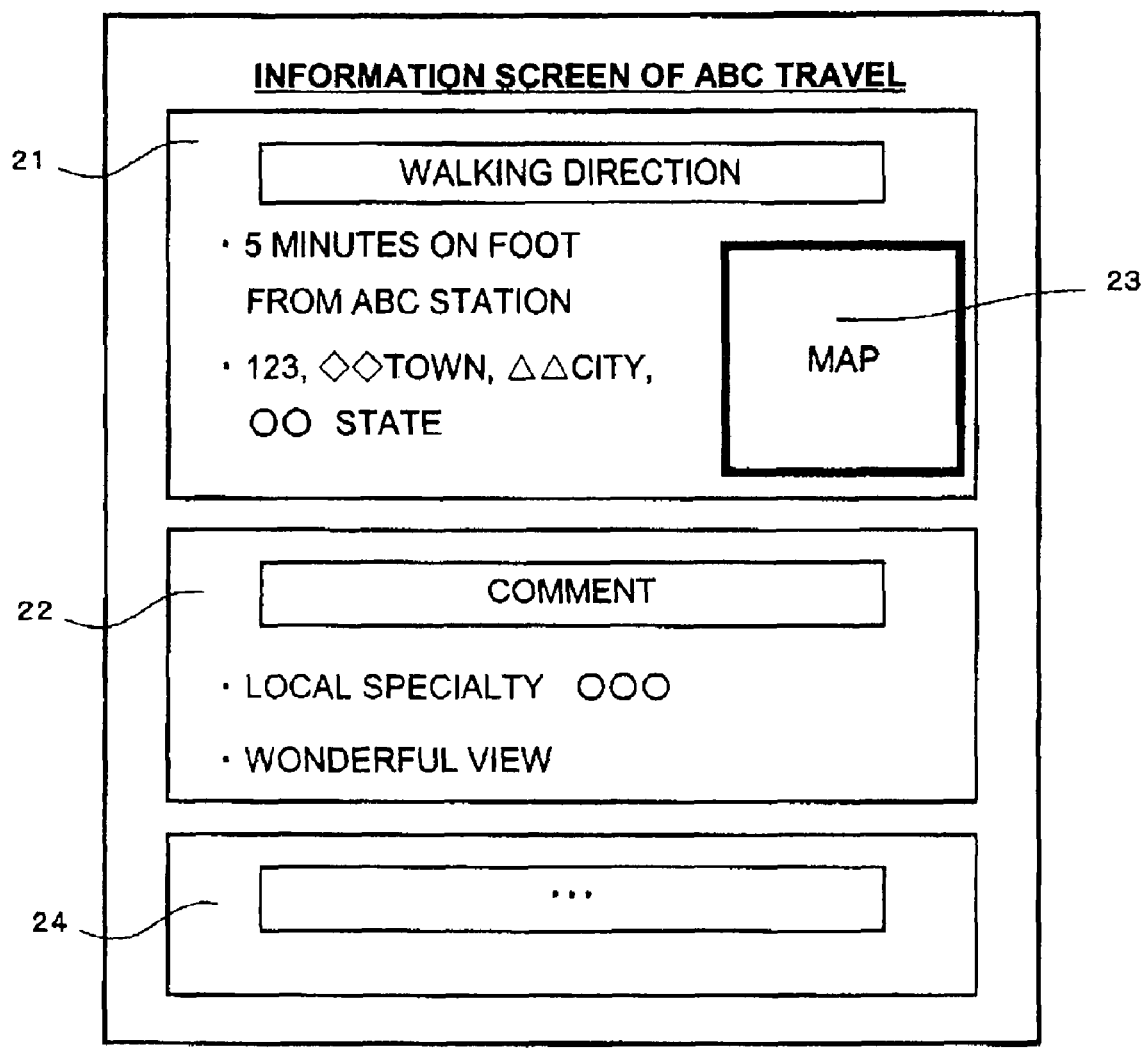
FIG. 4 is a flowchart showing an example of an information screen generated by the main controller in the digital TV.

Next, the information screen is described with reference to FIG. 4. FIG. 4 shows an example of an information screen generated by the main controller 17 when storing a TV program on travel named "ABC travel" (abbreviated as "a program on travel") in the HDD 14, for example. Here, it is assumed that the main controller 17 already obtains (recognizes) the characters indicating the places such as "123 (block number), ◇◇(town), ΔΔ(city), ○○(state)", "five minutes on foot from ABC station", or the like and the characters indicating the comments of the performers such as "local specialty ○○○", "have a wonderful view from ~", or the like from the images and the audios included in the program on travel.

As shown in FIG. 4, an information screen 20 of the program on travel has a form adapting to the TV program on travel, and the characters such as a walking direction 21, a comment 22, a map 23, other data 24, and so on recognized by the main controller 17 are displayed there.

As described above, according to the digital TV 1 of the present preferred embodiment, the main controller 17 generates the information screens, whose forms and contents are adapted to the types of the TV programs, with using the characters obtained from the TV programs stored in the hard disk, and subsequently displays the information screens on the display 11. Consequently, the digital TV 1 enables users to confirm easily the contents of the TV program, which is already watched, without troubles such as a purchase of a publication in which the contents of the TV programs are described, a review of an Internet website of the TV programs, a watching of the TV program again with taking notes, and so on.

The information screen is generated from the characters obtained from the TV program, thus the user can watch collectively the contents of the TV programs by watching the information screens displayed on the display 11.

The present invention is not limited to the composition of the preferred embodiment described above, however, various modifications are applicable without departing from the scope of the present invention. For example, in the digital TV 1 according to the preferred embodiment described above, the case of storing the map data in the HDD 14 in advance, however, the present invention is not limited to that case. For example, it is also applicable to store data of images of cooking, tourist spots around the countries, and so on in the HDD in advance, and when the characters recognized by the main controller relate to those data, those data can be read out from the HDD and then can be displayed on the information screen.

This application is based on Japanese patent application 2006-46356 filed Feb. 23, 2006, the contents of which are hereby incorporated by reference.

What is claimed is:

1. A television (TV) receiver comprising:
a display means to display images based on image signals, which are included in TV broadcast signals on TV programs, and various messages;
a control means to control each component of the TV receiver;
an image character recognition means to recognize captions included in images of the TV programs as characters;
a TV program type determination means to determine types of the TV programs; and
an information screen generating means to generate an information screen whose form and contents are adapted to each type of the TV programs,
wherein a recording means can be used to store the TV programs, and
wherein when the TV programs are stored in the recording means, the control means recognizes characters included in images of the TV programs using the image character recognition means, and also determines types of the TV programs using the TV program type determination means, and subsequently,
the control means further generates an information screen whose form and contents are adapted to each type of the TV programs, which are determined by the TV program type determination means, using characters recognized by the image character recognition means, and then displays the information screen on the display means, wherein the information display includes a location section with information on a location of a place mentioned in a particular TV program and a separate comment section with comments made by performers in the particular TV program about the place.

2. The TV receiver according to claim 1, further comprising
a voice character recognition means to recognize words included in audio of the TV programs as characters,
wherein when the TV programs are stored in the recording means, the control means recognizes characters included in images and audio of the TV programs using the image character recognition means and the voice character recognition means, and also determines types of the TV programs using the TV program type determination means, and subsequently,
the control means further generates an information screen whose form and contents are adapted to each type of the TV programs, which is determined by the TV program type determination means, using characters recognized by the image character recognition means and the voice character recognition means, and then displays the information screen on the display means.

3. The TV receiver according to claim 2, further comprising a tuner to receive TV broadcast signals of the TV programs.

4. The TV receiver according to claim 3 further comprising the recording means.

5. The TV receiver according to claim 4, wherein the recording means is a hard disk drive.

6. The TV receiver according to claim 2, further comprising the recording means.

7. The TV receiver according to claim 6, wherein the recording means is a hard disk drive.

8. The TV receiver according to claim 1, further comprising the recording means.

9. The TV receiver according to claim 8, wherein the recording means is a hard disk drive.

10. The TV receiver according to claim 1, further comprising a tuner to receive TV broadcast signals of the TV programs.

11. The TV receiver of claim 1, wherein a map of the location is obtained independent of the TV program and displayed in the location section.

12. The TV receiver of claim 11, wherein the information on the location includes an address and direction to the place mentioned in the particular TV program.

13. The TV receiver according to claim 12, further comprising
a voice character recognition means to recognize words included in audio of the TV programs as characters,
wherein when the TV programs are stored in the recording means, the control means recognizes characters included in images and audio of the TV programs using the image character recognition means and the voice character recognition means, and also determines types of the TV programs using the TV program type determination means, and subsequently,
the control means further generates an information screen whose form and contents are adapted to each type of the TV programs, which is determined by the TV program type determination means, using characters recognized by the image character recognition means and the voice character recognition means, and then displays the information screen on the display means.

14. The TV receiver according to claim 13, further comprising a tuner to receive TV broadcast signals of the TV programs.

15. The TV receiver according to claim 14 further comprising the recording means.

* * * * *